(12) United States Patent
Burba et al.

(10) Patent No.: US 9,232,383 B1
(45) Date of Patent: Jan. 5, 2016

(54) COURIER NETWORK

(71) Applicant: Microsoft Corporation, Redmond, WA (US)

(72) Inventors: Alexander Burba, Seattle, WA (US); Brandon T Hunt, Redmond, WA (US); Andy Hickmott, Redmond, WA (US)

( * ) Notice: Subject to any disclaimer, the term of this patent is extended or adjusted under 35 U.S.C. 154(b) by 0 days.

(21) Appl. No.: 14/314,156

(22) Filed: Jun. 25, 2014

(51) Int. Cl.
*G07F 19/00* (2006.01)
*H04W 8/00* (2009.01)
*H04W 4/00* (2009.01)
*H04W 88/04* (2009.01)

(52) U.S. Cl.
CPC .............. *H04W 8/005* (2013.01); *H04W 4/008* (2013.01); *H04W 88/04* (2013.01)

(58) Field of Classification Search
CPC ............... G07F 19/20; G06Q 20/1085; G06K 7/10881; G06K 7/10851; G06K 17/0022; G06K 7/10772
USPC .................. 235/379, 472.01, 472.02, 472.03, 235/462.45, 462.46
See application file for complete search history.

(56) References Cited

U.S. PATENT DOCUMENTS

| | | |
|---|---|---|
| 7,970,350 B2 | 6/2011 | Sheynman et al. |
| 8,145,532 B2 | 3/2012 | Jones et al. |
| 8,463,842 B2 | 6/2013 | Ijichi |
| 8,594,632 B1 | 11/2013 | Azizi et al. |
| 2002/0060994 A1 | 5/2002 | Kovacs et al. |
| 2005/0150959 A1* | 7/2005 | Izzo et al. ................ 235/472.02 |
| 2013/0034082 A1 | 2/2013 | Etemad et al. |
| 2013/0288668 A1 | 10/2013 | Pragada et al. |
| 2013/0324114 A1 | 12/2013 | Raghothaman et al. |
| 2014/0010172 A1 | 1/2014 | Wei et al. |

(Continued)

FOREIGN PATENT DOCUMENTS

| | | |
|---|---|---|
| WO | 2013052163 A1 | 4/2013 |
| WO | 2013171115 A1 | 11/2013 |
| WO | 2014032552 A1 | 3/2014 |

OTHER PUBLICATIONS

Woollaston, Victoria, "The App that lets you Chat Without an Internet or Phone Connection: FireChat uses Hidden iOS Feature to Relay Message", Published on: Mar. 27, 2014, Available at: http://www.dailymail.co.uk/sciencetech/article-2590589/The-app-lets-chat-WITHOUT-internet-phone-connection-FireChat-uses-hidden-iOS-feature-relay-messages.html.

(Continued)

*Primary Examiner* — Karl D Frech
(74) *Attorney, Agent, or Firm* — Aaron Chettergee; Micky Minhas

(57) ABSTRACT

Example apparatus facilitate couriering (e.g., physically carrying) targeted electronic data between a provider in a first physical location and a recipient in a second physical location. An apparatus may store targeted electronic data or may store metadata concerning the targeted electronic data. The apparatus may also store requests for targeted electronic data or information from which targeted electronic data can be identified. An example apparatus may identify targeted electronic data to be provided and may then acquire the targeted electronic data from a provider. The provider may be another courier, another recipient, a source provider (e.g., database), or other source. The apparatus may provide the targeted electronic data to the recipient using a close-range communication channel that does not use the Internet. The targeted electronic data may be identified based on a state of an operating system, an application, or content at the recipient.

38 Claims, 12 Drawing Sheets

(56) References Cited

U.S. PATENT DOCUMENTS

2014/0094119 A1    4/2014    Stojanovski et al.
2014/0094122 A1    4/2014    Etemad et al.

OTHER PUBLICATIONS

Ramasubramanian, et al., "Secure and Smart Media Sharing Based on Direct Communications among Mobile Devices Underlying in LTE-A Cellular Network", Retrieved on: May 8, 2014, Available at: http://www.tacoma.uw.edu/sites/default/files/global/documents/institute_tech/S_Ramasubramanian.pdf.

Ott, et al., "DTN-Based Content Storage and Retrieval", In Proceedings of the International Symposium on a World of Wireless, Mobile and Multimedia Networks, Jun. 1, 2007, 7 pages.

Zhao, et al., "A Message Ferrying Approach for Data Delivery in Sparse Mobile Ad Hoc Networks", In Proceedings of the 5th International Symposium on Mobile Ad Hoc Networking and Computing, Jan. 1, 2004, 12 pages.

\* cited by examiner

COURIER NETWORK

BACKGROUND

There are approximately 7.2 billion people in the world. There are also approximately 1.5 billion cell phones and smart phones. For many people, instant-access high-speed real-time connectivity is the norm. For billions of other people, once a day or even once a week email, social media interaction, or other "connectivity" would be revolutionary. Devices (e.g., smart phones, tablets, laptops, computers, game systems) that are able to connect to the Internet seem to be nearly ubiquitous. Whether walking the streets of New York City, hiking in the remote high Andes, trekking to parts unknown in Outer Mongolia, sitting in a coffee shop in Seattle, or taking a restful weekend in Amish country in Ohio, there is likely to be a connection enabled device nearby (e.g., in your hand). While devices are nearly ubiquitous, connectivity is not. Certainly connectivity continues to reach deeper into even the farthest corners of the world, but there are still gaps in coverage. Popular television commercials in the United States compare coverage maps for various carriers, with all the coverage maps showing significant gaps. In addition to actual gaps, where there is simply no connectivity infrastructure, gaps may be practical or economic, where connectivity is too expensive, too slow, or too insecure to be practically or economically useful.

Since devices are nearly everywhere, and since connectivity is not yet everywhere, devices that are used to communicating frequently with the Internet may be forced to function at a reduced level when connectivity is not available. While this reduced functionality may be inconvenient at times, it may be economically or even physically dangerous at others. For example, not being able to watch the most recent version of a television show may be inconvenient while not being able to receive the most recent update to a map or to receive a weather forecast may be physically dangerous. Not being able to receive the most recent security update or encryption update may be economically dangerous. Additionally, regardless of whether the reduced capability is dangerous or just annoying, the loss of connectivity reduces the utility of mobile devices.

Gaps in connectivity may be actual or may be economic or practical. An actual gap exists when there is simply no connection. The lack of connection may be temporary (e.g., network down, network overloaded, electrical blackout) or may be more systemic (e.g., lack of infrastructure). An economic or practical gap may exist even when an actual connection exists. For example, a low-speed yet high-cost connection may be available for a device. The user of the device may not want to spend an unjustifiable amount of time and money to use the low-speed high-cost connection to download a large file. However, the user of the device may be willing to spend a little time and a little money to order from a catalog of available content or to send/receive a critical message. The catalog of available content from which a user may order may even have been distributed in paper form like the old-time catalogues from department stores. In this case, delivery of digital content through an existing though impractical link may not be desired, even if an order can be placed through the impractical link.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods facilitate delivery of digital content through a courier based network. In a base case, one device may act as a content provider, one device may act as a courier, and one device may act as a recipient. At some point in time the courier may have acquired content that may be of interest to the recipient. The content may have been acquired at a first location, stored in the memory of the courier device, and then physically transported to a second location in the courier device as the courier device moved around. In different embodiments, the courier may have acquired the content in response to an earlier request from the recipient, may have acquired the content on its own, may have acquired the content in response to a direction from a content provider, or may have acquired the content for other reasons. When the courier device and the recipient device are close enough to communicate using, for example, device to device protocols that do not use the Internet or other long range connections (e.g., cellular), the content may be transferred from the courier device to the recipient device. In different embodiments, the users of the courier device or recipient device may be aware of the transfer or may not be aware of the transfer. In different embodiments, the device acting as the courier may or may not be able to access the content being couriered, and may or may not be able to control delivery of the content being couriered.

In one example, an apparatus facilitates couriering curated electronic data between a provider apparatus in a first physical location and a recipient apparatus in a second physical location. The apparatus may store curated electronic data that is acquired from a provider or may store metadata concerning the curated electronic data. The apparatus may also store requests for curated electronic data or information from which curated electronic data can be identified. An example apparatus may identify curated electronic data to be provided and may then acquire the curated electronic data from a provider. The provider may be another courier, another recipient, a source provider (e.g., database), or other source. The apparatus may provide the curated electronic data to the recipient apparatus using, for example, a close-range communication channel that does not use the Internet. The two transfers will occur in different locations at different times. The locations may be separated by, for example, a mile, ten miles, or even further and the transfers may occur an hour, a day, or even a greater amount of time apart.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
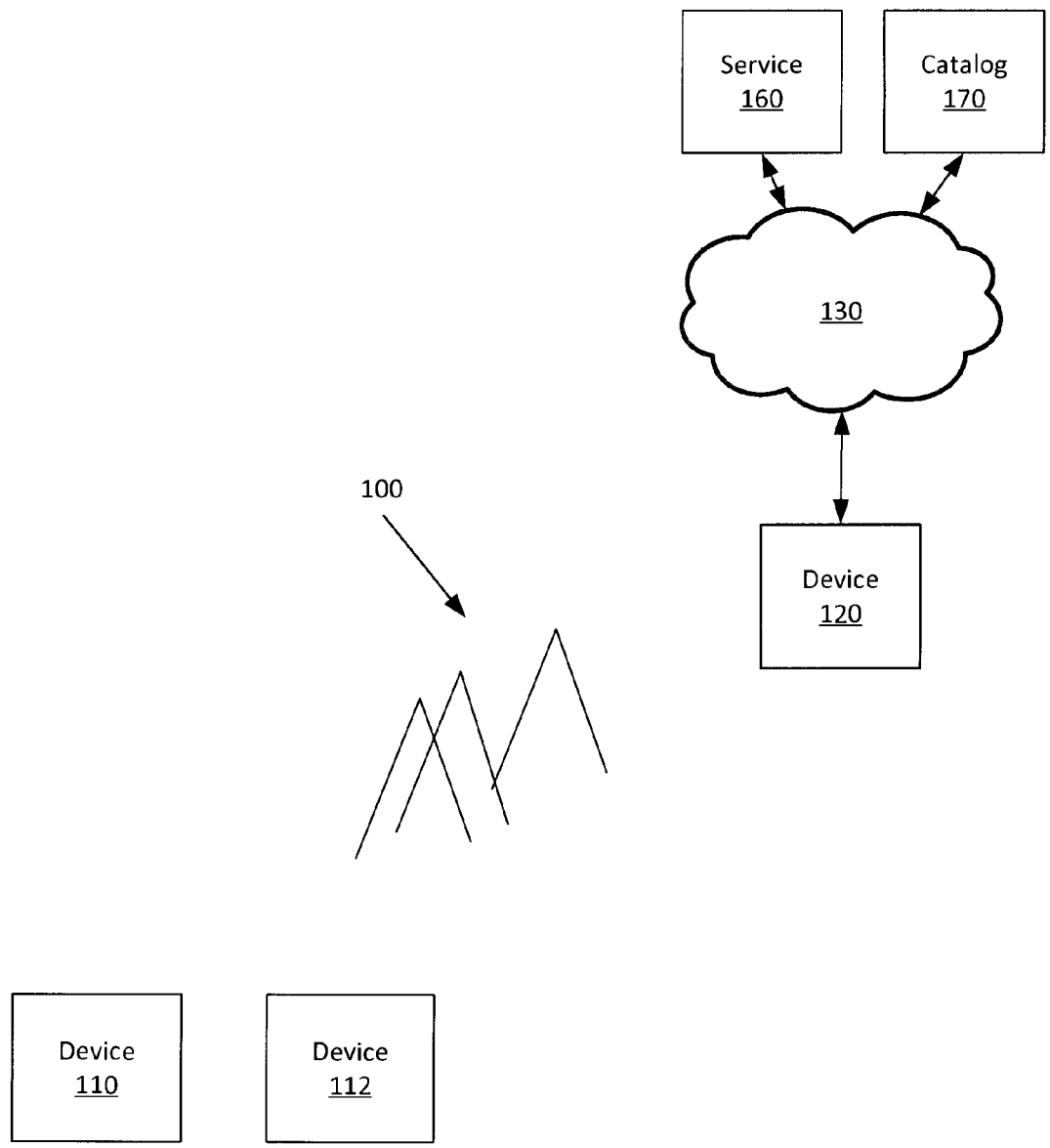
FIG. 1 illustrates a disconnected device and a device that may act as a courier.

Current thinking about delivery of digital content assumes ubiquitous, high-speed, low-cost, two-way connectivity. However, in many areas and in many situations it may be difficult or even impossible to deliver digital content due to systemic or temporary issues. Delivery may be impossible or impractical due to unavailable, unreliable, insecure, or intermittent connectivity. Delivery may also be impossible or impractical due to factors including unacceptable transfer speeds or costs. While this "last mile problem" may be more prevalent in some locations (e.g., remote regions where it may be a "last hundred mile" problem), the last mile problem is also encountered in locations having the greatest amount of infrastructure, where it may be a "last twenty yards" problem. For example, when a noteworthy event occurs, even the most robust infrastructure may be overwhelmed by users of connected devices simultaneously communicating about the event. Thus, not only is the last mile problem encountered when hiking in the remote high Andes or visiting Amish Country in rural Ohio, but the twenty yards problem is also encountered in Times Square at midnight on December $31^{st}$, during the Super Bowl or World Cup Final, and when global events (e.g., tsunami, missing jetliner) dominate our collective consciousness.

Mobile devices (e.g., phones, tablets, laptops, game devices) are widely available and mobile. These devices, being mobile, move around. They move from hand to hand, from room to room, from building to building, from town to town, from country to country, and even from continent to continent in ever changing paths and patterns. Thus, while conventional "connectivity" may not be available through conventional Internet infrastructure, the billions of mobile devices that are frequently in motion facilitate providing a courier-based connectivity that employs device to device communications. While hundreds of millions of people are used to high-speed real-time connectivity, billions of others view once an hour, once a day, or even once a week email, social media, or content delivery as revolutionary.

Device to device (D2D) communication is well understood and continues to evolve. For example, near field communication (NFC) has facilitated bump connectivity where two devices that are put in very close proximity can share digital data. D2D connectivity may occur at longer ranges than possible via NFC. For example, WiFi, Bluetooth, or other non-Internet based near range communications may be employed. At any given time, a mobile device may be in non-Internet based range of dozens or even hundreds of mobile devices. This local connectivity phenomenon has been exploited in D2D environments that employ mobile hotspots or other techniques for connecting to the Internet or to create ad hoc local networks where content sharing may be employed.

While D2D has been exploited for certain types of communications and connectivity, the last mile problem, the last hundred mile problem, and the last twenty yards problem still remain and, in some cases, are becoming more profound as more and more devices compete for limited bandwidth. The opportunities for D2D interactions increase as more and more devices are available and come in intermittent contact with other mobile devices. Example apparatus and methods use the phenomenon of mobile devices that travel around to facilitate transferring data not just D2D but also device to destination, destination to device, and device or destination to service using a courier-based approach that does not rely on Internet connectivity for the ultimate transfer. When being couriered, data may be transferred many miles away hours after being acquired.

Content (e.g., digital data) or requests for content may enter a mobile device ecosystem via a courier, via a recipient, via a provider, or in other ways. A courier may move around in the ecosystem. When the courier encounters a mobile device that is actually disconnected, practically disconnected, or even connected, a transfer may occur between the courier and the encountered device. The transfer may flow from the courier to the encountered device or from the encountered device to the courier. For example, when connected to the Internet, a courier may receive an update to an application. When the courier encounters a device that has that application, the courier may push the update to the encountered device or may make the update available for pulling by the encountered device. In another example, an encountered device may interrogate the courier to determine what content, if any, the encountered device wishes to have delivered from the courier. An encountered device may also provide information to the courier about content that the encountered device would like to receive in the future. The courier may then regain connectivity and upload requests to the Internet and download content from the Internet. Before or after regaining connectivity, the courier may move to another location and repeat the process with other encountered devices.

In one example, an encountered device may in turn encounter other devices that may act as either couriers that provide additional content or that act as encountered devices and that receive content from the encountered device which acts as a courier. In this way, digital content or requests for digital content may be spread throughout the ecosystem during encounters between devices without using the Internet. This may be referred to as, for example, CourierNet or TomasNet (Transfer Over Mobile Apparatus Service). In different examples, the content may be spread organically, may be spread as directed by a service, may be spread under control at the local device level, or may be spread in other ways as the courier devices physically move from place to place and thus physically carry data in their memories from place to place.

Consider a simple scenario where one device acts as a courier and one device acts as a recipient. At some point in time the courier may have acquired content that may be of interest to the recipient. In different embodiments, the courier may have acquired the content in response to an earlier request from the recipient, may have acquired the content on its own, may have acquired the content in response to a direction from a content provider, or may have acquired the content for other reasons. When the two devices are close enough to communicate without using the Internet or other long range connections (e.g., cellular), the content may be transferred, a request for content may be transferred, or other information may be transferred between the devices. In different embodiments, the users of the courier device or recipient device may be aware of the transfer or may not be aware of the transfer. In different embodiments, the device acting as the courier may or may not be able to access the content being couriered, and may or may not be able to control delivery of the content being couriered.

In one example, a user may have a laptop computer at a disconnected location (e.g., cabin in the mountains) and may have a mobile device that travels with them "to town" where there is connectivity. The mobile device or some other actor may be aware that the laptop computer has a certain version of a certain operating system. When the mobile device is connected to the Internet, the mobile device may acquire an update to the operating system. After the mobile device moves from the acquisition point to another point and is subsequently in close enough proximity to the laptop computer, the update to the operating system may be transferred to the laptop. While an operating system is mentioned, the content that is transferred may include, but is not limited to, movies, books, web pages, documents, photographs, videos, applications, application patches, application updates, operating systems, operating system updates, security patches, encryption keys, and other information. While a direct transfer from the courier to the recipient is described, in one embodiment the content may transit a series of couriers before reaching the recipient. Also, the courier may provide the content to multiple recipients.

In one embodiment, a series (e.g., two) of D2D transfers may be more secure than an Internet communication. In this embodiment, a courier may connect to a first device at a first location and acquire digital content using a secured connection. The courier may then travel to a second location where the courier encounters a recipient device and transfers the digital content to the recipient device using a secured connection. This courier network based secure communication may be preferable to Internet communications since the sensitive data may be transferred directly from the provider to the courier and directly from the courier to the recipient without being exposed to the Internet. Encryption keys or one-time cipher pads may also be distributed in this fashion.

FIG. 1 illustrates a disconnected device 110, a disconnected device 112, and a connected device 120 that may act as a courier. The connected device 120 may be connected to, for example, the Internet 130 or other network or application. Through the Internet 130, the device 120 may have access to a service 160, a catalog 170, or other applications or content. The devices 110 and 112 may be separated from the device 120 and the Internet 130 by, for example, a mountain range 100. Consider a village in the Andes. Children in the village may have smart phones and tablets and may like playing a video soccer game. The village may not have Internet connectivity. A villager may travel "to town" on a frequent basis (e.g., daily, weekly). If the villager takes a smart phone or other device with them to town, then the villager's device may be able to act as a digital courier. In this way, a patch, update, or additional data for the video soccer game may be downloaded "in town" and brought back to the village by the courier. The patch may then be downloaded from the courier device to devices located in the village. The courier is not acting as a hot spot or distribution point through which a real-time connection is shared, but instead is acting as a temporary repository for requests that are physically carried from village to town and content that is physically carried from town back to the village. This courier based approach resolves the technical issue of providing connectivity to remote locations where Internet or cellular coverage is not available.

Devices in the village may make explicit requests to the courier device to acquire specific content when connectivity is available. The courier may select content that it predicts may be wanted by devices in the village. A content provider may push certain content to the courier device in anticipation of the courier encountering devices that may want or need the content. The content provider may push or otherwise provide metadata describing a portion or even all of its content. A courier may interact with multiple providers at multiple locations.

The service 160 may track interactions between the courier device 120 and the catalog 170, between recipient devices (e.g., 110, 112) and the catalog 170, between recipient devices (e.g., 110, 112) and the courier device 120, or other interactions. The service 160 may then predict which content to provide to device 120 based, for example, on the recipient devices that the courier device 120 is likely to encounter or the content that the recipient devices are likely to need or want.

Figure 2:
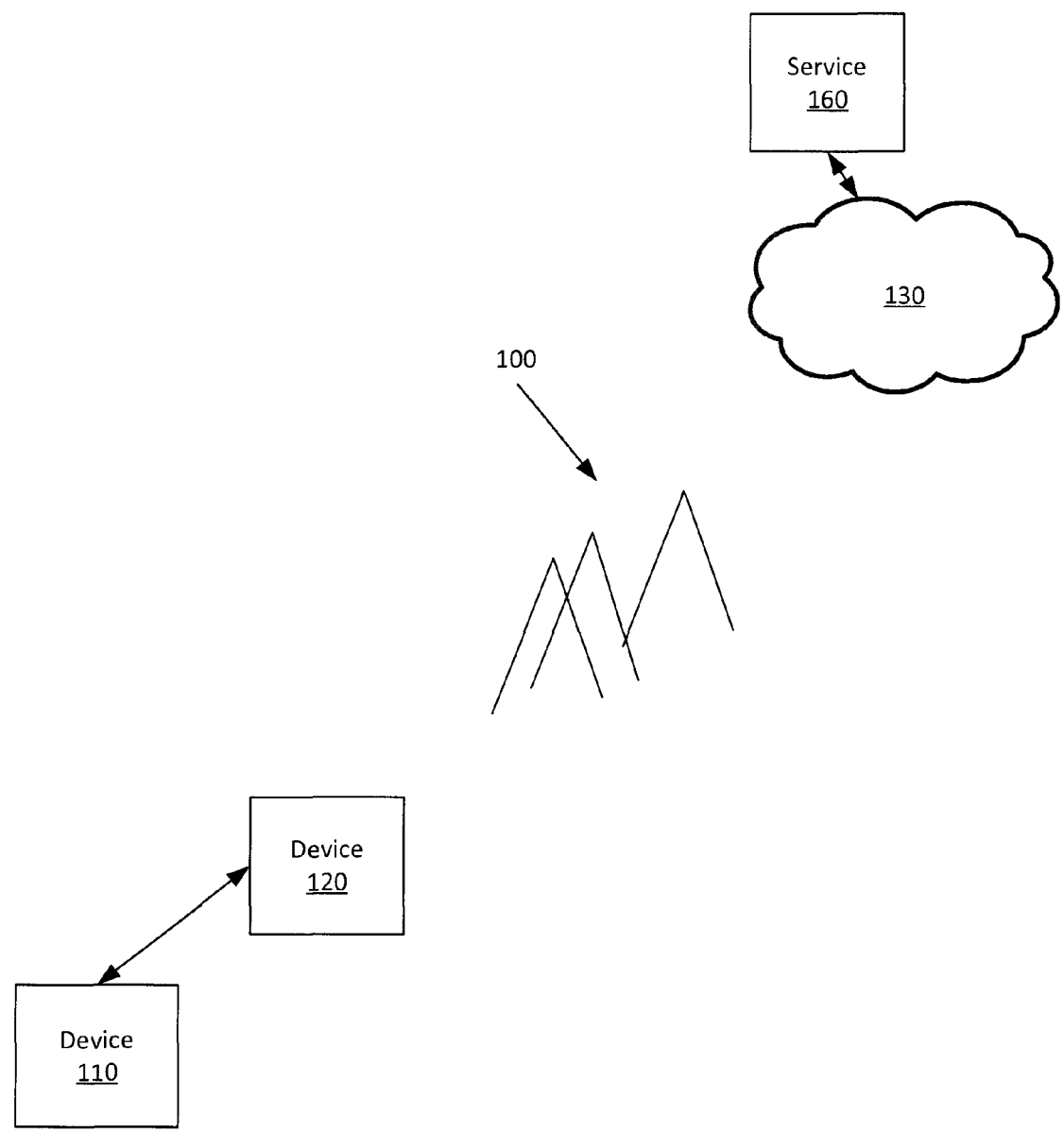
FIG. 2 illustrates a disconnected device and a device acting as a courier.

FIG. 2 illustrates a disconnected device 110 and a courier device 120 after the courier device 120 has come in contact with the disconnected device 110. Recall that the disconnected device 110 may be actually disconnected (e.g., no connectivity) or may be practically disconnected because a link available to device 110 is too expensive, not secure enough, too slow, or suffering from other impracticalities. Returning to our Andean example, the courier device 120 may have crossed a high mountain pass on the way from "town", where the Internet 130 was available, to the village where device 110 is located. Device 120 may have content that device 110 requested, that service 160 wanted pushed to device 110, that service 160 predicted device 110 might want, or other content. Device 120 and device 110 may establish communications using a close range mechanism (e.g., NFC, Bluetooth, WiFi) without using the Internet and content may flow from device 120 to device 110. Additionally, requests may flow from device 110 to device 120 for courier device 120 to carry back "to town." This courier approach resolves the technical issue of providing digital updates to devices that do not have real-time access to the Internet.

Figure 3:
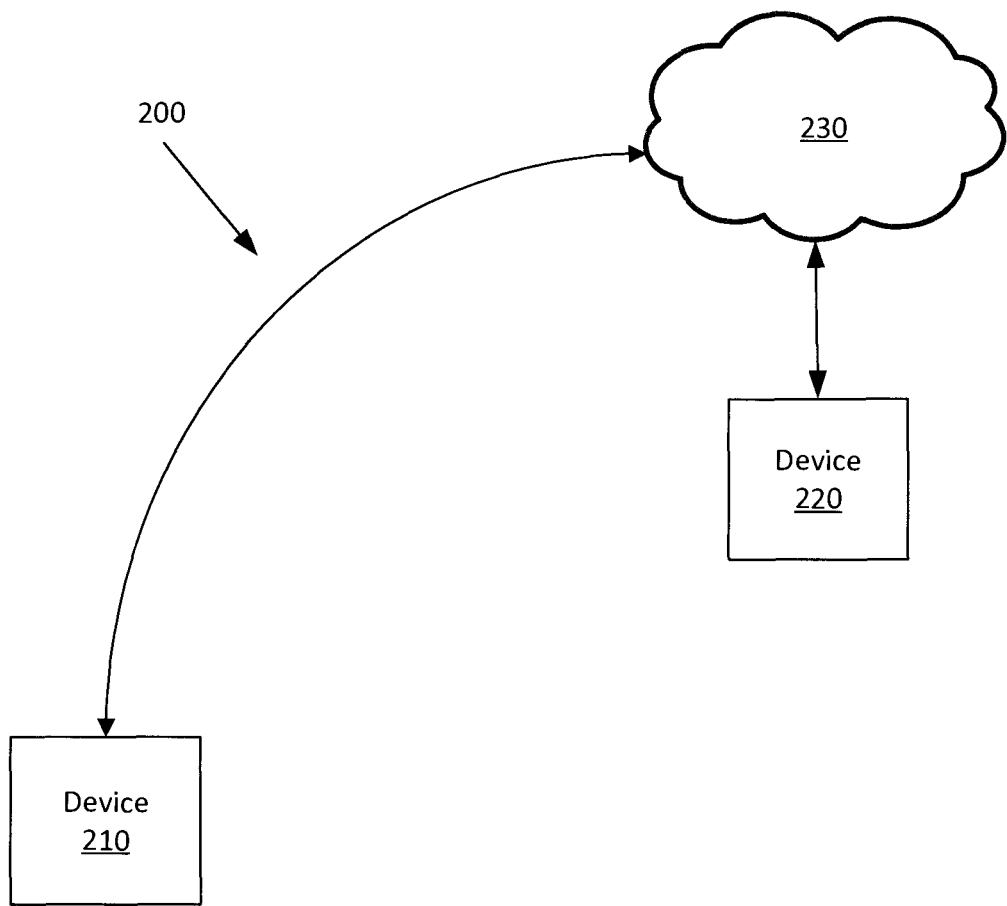
FIG. 3 illustrates a device that is practically or economically disconnected and a device that may act as a courier.

FIG. 3 illustrates a device 210 that is practically or economically disconnected from the Internet 230 and a device 220 that may act as a courier. Device 210 may have the ability to communicate directly with the Internet 230 through link 200. However, link 200 may be so expensive, so slow, or so insecure that device 210 may prefer to communicate using a courier protocol available via device 220. In one embodiment, device 210 may communicate a small amount of data (e.g., content request) via link 200 and the content may then be provided to device 220 with the expectation that device 220 will come in close enough contact with device 210 to transfer the content in a less costly, faster, or more secure communication than was possible using link 200. While a single device 210 is illustrated having a single link 200 to the Internet 230, a number of devices may have a number of links to the Internet 230 or other networking applications or content providers. Similarly, while a single courier device 220 is illustrated, the content to be delivered to device 210 may be provided to a number of courier devices that are likely to come in contact with device 210. This courier based approach resolves the technical issue of lowering the cost of acquiring digital content in environments where direct or real-time Internet connectivity is unacceptably expensive.

Figure 4:
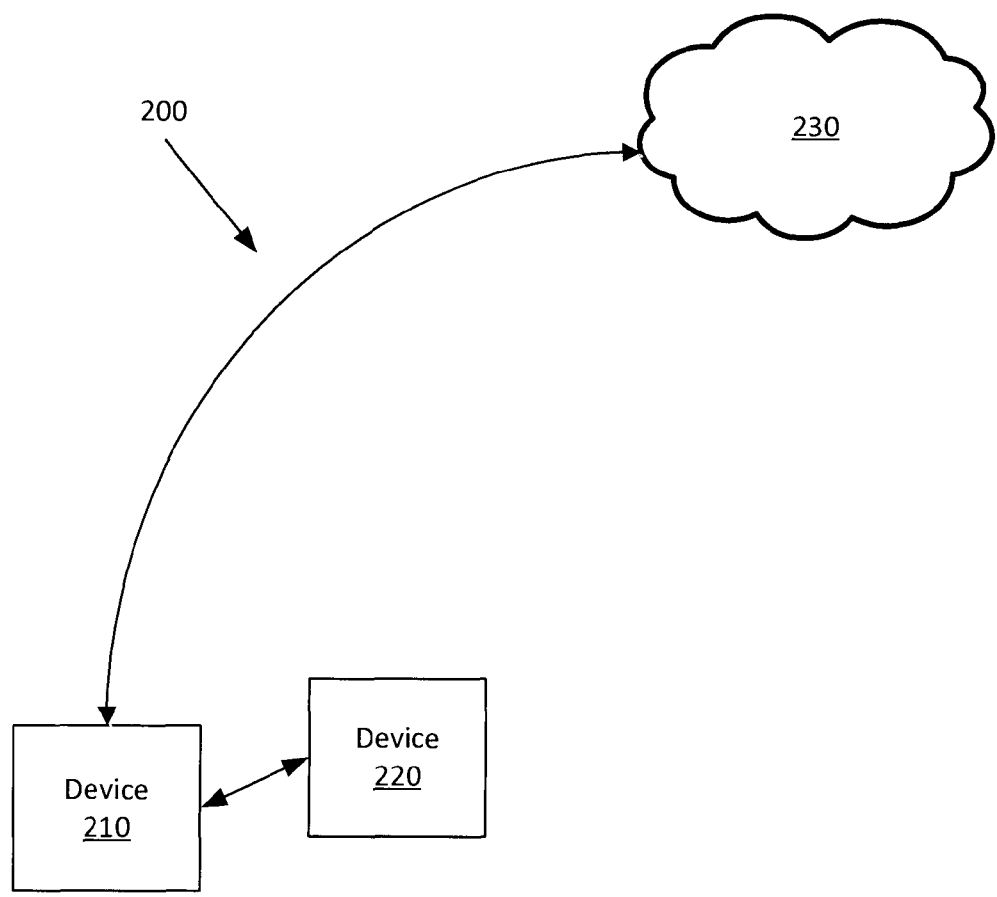
FIG. 4 illustrates a device that is practically or economically disconnected and a device acting as a courier.

FIG. 4 illustrates a device 210 that is practically or economically disconnected and device 220 acting as a courier.

Device 220 has come in close enough proximity to device 210 to communicate content that was previously acquired from, for example, the Internet 230, to device 210 using a close range protocol (e.g., device to device) and without using the link 200.

Figure 5:
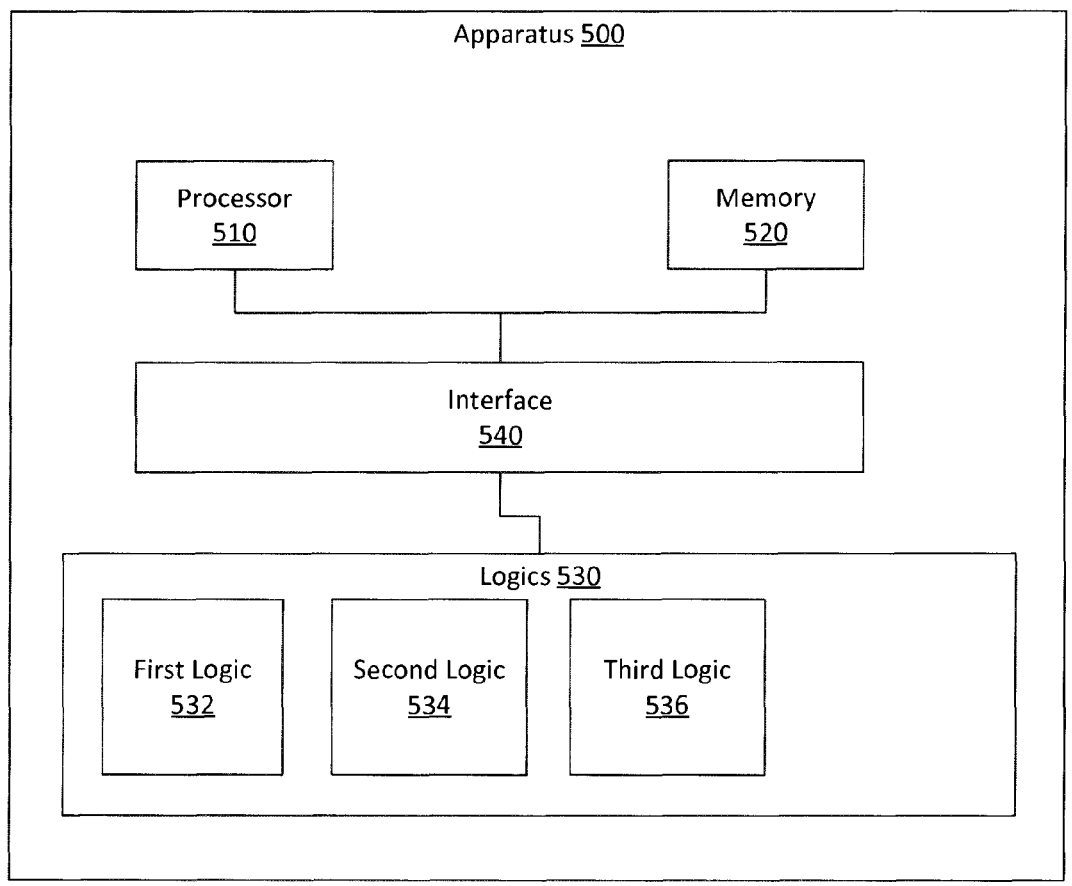
FIG. 5 illustrates an example apparatus for couriering content.

FIG. 5 illustrates an apparatus 500 that provides a courier service. Apparatus 500 may include a processor 510, a memory 520, a set 530 of logics, and an interface 540 that connects the processor 510, the memory 520, and the set 530 of logics. The processor 510 may be, for example, a microprocessor in a computer, a specially designed circuit, a field-programmable gate array (FPGA), an application specific integrated circuit (ASIC), a processor in a mobile device, a system-on-a-chip, a dual or quad processor, or other computer hardware. Memory 520 may store curated electronic data to be couriered to disconnected devices, requests for curated electronic data, account data, preferences data, or other data.

In one embodiment, the apparatus 500 may be a general purpose computer that has been transformed into a special purpose computer through the inclusion of the set 530 of logics. Apparatus 500 may interact with other apparatus, processes, and services through, for example, a computer network. Apparatus 500 may be, for example, a computer, a laptop computer, a tablet computer, a personal electronic device, a smart phone, a system-on-a-chip (SoC), or other device that can access and process data.

The set 530 of logics control the courier apparatus 500 to courier targeted electronic data between a provider apparatus in a first physical location and a recipient apparatus in a second physical location. To "courier" data means that the curated electronic data is physically moved from one physical location to another physical location in the memory 520 of the courier apparatus 500. The targeted electronic data is specifically selected for being carried in the memory 520. The targeted electronic data may include, for example, an operating system, an operating system update, an application, an application update, a piece of content (e.g., movie, video game, electronic book, electronic document) an update to a piece of content, or an encryption key.

The first physical location and the second physical location are separated by a threshold distance (e.g., one kilometer, one mile, ten miles). The threshold distance may be large (e.g., across a continent) or small (e.g., across the aisle in an airplane, the distance between a smart phone on a desk and a laptop computer on the same desk). The courier will receive the targeted electronic data at the first location (e.g., Cusco) from a first device (e.g., content server), store the targeted electronic data in memory 520, be physically relocated to a second location (e.g., Llactapata), and provide the targeted electronic data to a second device (e.g., kid's tablet). The content may be copied to the apparatus 500 at a first time and provided to the second apparatus at a second later time. The first time and the second time are not instantaneous because the apparatus 500 has to physically move from place to place. Instead, the first time and the second time are separated by at least a threshold amount of time during which the apparatus 500 physically moves from the first location to the second location. The amount of time may be, for example, an hour, a day, or even more. The amount of time may also be very short (e.g., 1 millisecond) when, for example, the first location, the courier device, and the second location are all co-located (e.g., on a plane, on a desk). In different embodiments, the targeted electronic data may be acquired or provided by the apparatus 500 with or without the apparatus 500 being aware that it is acting as a courier. In different embodiments, the apparatus 500 may or may not be able to access a request or response associated with the targeted electronic data.

The set 530 of logics may include a first logic 532 that identifies the targeted electronic data based on information about the recipient apparatus. The first logic 532 may identify the targeted electronic data based on information about the recipient apparatus that is provided by the recipient apparatus. The information about the recipient apparatus describes, for example, a state of the recipient apparatus. The state may include information about, for example, an operating system present on the recipient apparatus, a date at which the operating system was last updated, an application (e.g., word processor, video game) on the recipient apparatus, a date at which the application was last updated, content (e.g., movie, book, video, document) on the recipient apparatus, or other information.

The information about the recipient apparatus may be a request for specific electronic data. For example, the recipient apparatus may want a new video game or book or document and may provide the apparatus 500 with a request for that content knowing that the apparatus 500 will physically move around and possibly come in contact with a provider apparatus that can provide the requested content.

The first logic 532 may identify the targeted electronic data based on information about the recipient apparatus that is provided by the provider apparatus. The provider apparatus may store information that it has received from or about the recipient apparatus. Additionally, the provider apparatus may store information that it has generated about the recipient apparatus. For example, the provider apparatus may have been tasked with provisioning the recipient apparatus and thus may know which content has been provided to the recipient apparatus in the past. The information about the recipient apparatus may describe a state of the recipient apparatus. The state may include information about, for example, an operating system present on the recipient apparatus, a date at which the operating system was last updated, an application (e.g., word processor, video game) on the recipient apparatus, a date at which the application was last updated, content (e.g., movie, book, video, document) on the recipient apparatus, or other information.

The information about the recipient apparatus may be a request for specific electronic data, a response to a request for specific electronic data, or a catalog of curated electronic data that is available at the provider apparatus for couriering to the recipient apparatus. The catalog may be for a specific recipient apparatus or may be more general.

Thus, members of the two or more request/response iterations may be separated in time by more than an hour, or even longer. Since the apparatus 500 may carry multiple requests and responses associated with multiple request/response iterations, the memory 520 may store a set of requests from the recipient apparatus or a set of responses from the provider apparatus. The first logic 532 may then identify the targeted electronic data by replaying members of the set of requests or members of the set of responses.

A recipient apparatus may only want to receive content that can be provided within a certain time and at a certain cost. Thus, in one example, the first logic 532 provides an estimated fulfillment time for the targeted electronic data or an estimated fulfillment cost for the targeted electronic data. The recipient apparatus may then decide whether to proceed with its courier network based request or may decide to cancel the courier network based request.

While the first logic 532 may identify the targeted electronic data based on an actual request from a recipient or based on a mismatch between actual state (e.g., operating system version 1.1) and a desired state (e.g., operating system version 1.2), in one example the first logic 532 may also identify the targeted electronic data based on a predictive heuristic. The predictive heuristic may, for example, use a current state of the recipient apparatus and an output from a recommendation (e.g., if you liked this you might like that) system. Thus, apparatus 500 may carry information that the recipient apparatus may later decide to accept or refuse.

The set 530 of logics may also include a second logic 534 that acquires the targeted electronic data from the provider apparatus at a first time using a first communication approach. The first communication approach may involve using the Internet. For example, the apparatus 500 may reach a location where there is Internet connectivity and may activate its courier role where requests are uploaded to a provider through the Internet and content is received from the provider via the Internet.

The second logic 534 may or may not acquire the targeted electronic data. For example, the second logic 534 may selectively not acquire the targeted electronic data upon detecting a cancellation request from the recipient apparatus. The second logic 534 may receive a denial of the request from the provider apparatus, from a content provision service, or from another source. The denial may arrive when an evaluation of a reputation status or account status associated with the recipient apparatus reveals that the data should not be provided. For example, a request may be denied when the cost of the content exceeds the balance or credit status for a requestor.

In one embodiment, the second logic 534 acquires the targeted electronic data using a request/response model. A request is carried from the recipient apparatus to the provider apparatus by the courier apparatus 500. A response is carried from the provider apparatus to the recipient apparatus by the courier apparatus 500. A request may travel from a recipient apparatus to a provider apparatus via one courier apparatus 500 and the response may travel back via another courier apparatus 500 or series of courier apparatus.

In one embodiment, the second logic 534 may acquire the targeted electronic data using a push model. The targeted electronic data may be pushed to the courier apparatus 500 from a content provider, from a service, from a courier device, or from a recipient apparatus. Once again, when the courier apparatus 500 reaches a location where there is Internet or other network connectivity or a connection available to a content provider, the Internet or other network or content provider may become aware of apparatus 500 and may push data to apparatus 500.

In one embodiment, the second logic 534 acquires the targeted electronic data using a pull model. The second logic 534 may pull the targeted electronic data from a content provider, from a service, from a courier device, or from a recipient apparatus. The second logic 534 may pull the data upon determining that a device from which data can be pulled is in range of a connection (e.g., Internet) available to the apparatus 500.

Different communication channels may be available for transferring the targeted electronic data. Thus, the second logic 534 may select a communication channel for receiving the targeted electronic data from the provider apparatus based on cost, security, bandwidth, or speed. One piece of content may be very large and thus the channel may be selected for bandwidth and speed. Another piece of content may be very sensitive and therefore the most secure channel may be selected.

A person who is moving around is, by definition, moving around. The courier apparatus 500 may therefore have windows of time during which content may be provided or requests may be transferred as the person moves from place to place where different communication channels are available. To increase the likelihood that a courier based transfer may occur, the second logic 534 may provide an indication to a user of the courier apparatus 500 describing a period of time to remain in place to facilitate completing a transfer. In this way, a user of courier apparatus 500 may stay put long enough in a location for a transfer to occur.

The set 530 of logics may also include a third logic 536 that provides the targeted electronic data to the recipient apparatus at a second time using a second communication approach that does not use the Internet. In one example, the third logic 536 provides the targeted electronic data using a push model. The push model may push the targeted electronic data directly to the recipient apparatus. In one embodiment, the third logic 536 may indirectly push the targeted electronic data to another courier apparatus that is likely to encounter the recipient apparatus. When the courier apparatus 500 comes within range of the recipient apparatus or another courier apparatus, the third logic 536 may push information or targeted electronic data to those devices.

In one example, the third logic 536 may provide the targeted electronic data using a request/response model. In this model, a request may move from the recipient apparatus to the courier apparatus 500 and from the courier apparatus 500 to the provider apparatus. Additionally, the response may move from the provider apparatus to the courier apparatus 500 and from the courier apparatus 500 to the recipient apparatus. The request and response may transit multiple courier apparatus and may travel back and forth along different series of courier apparatus.

The third logic 536 may select a communication channel for providing the targeted electronic data to the recipient apparatus based on cost, security, bandwidth, or speed. For example, a near field communication channel that is very secure may be selected to transfer certain content to a specific recipient apparatus. A local area network with a high transfer rate may be selected to transfer other content to a collection of recipient apparatus.

In one embodiment, the targeted electronic data has an expiration time beyond which the third logic 536 will not provide the targeted electronic data. For example, if the expiration time has passed, then the third logic 536 will not provide the targeted electronic data being carried in the memory 520 of the apparatus 500 to a recipient device. To conserve resources in apparatus 500, the third logic 536 may cause the content to be deleted once the expiration time has passed.

The recipient apparatus and the provider apparatus may be separated by long distances. For example, the recipient apparatus may reside in a village on one side of a high mountain pass and the provider apparatus may reside in a city located on the other side of the mountain pass. Identifying the right information to be carried by the courier apparatus 500 may require more than one interaction (e.g., request/response) between the recipient apparatus and the provider apparatus. Thus, the first logic 532 may identify the targeted electronic data based on information transferred in two or more request/response iterations between the recipient apparatus and the provider apparatus. A request/response iteration involves couriering a request from the recipient apparatus to the provider apparatus and couriering a response from the provider apparatus to the recipient apparatus. Recall that couriering involves physically carrying electronic data in a memory from place to place. The requests and responses may travel back and forth in the same courier apparatus 500 or at least one of the requests or responses may travel between the provider and recipient apparatus in a different courier apparatus. More generally, courier apparatus 500 may receive requests or state from more than one recipient apparatus in more than one recipient location and may also receive content or state from more than one provider apparatus in more than one provider location.

Identifying, acquiring, and providing targeted electronic data may involve two or more iterations of interactions between the recipient apparatus and the provider apparatus. The two or more iterations may be handled completely or in part by the courier apparatus 500. Consider a request for an upgrade to an operating system. The request may need to be orchestrated into multiple phases where requests, responses, or state transit multiple devices in multiple sessions (e.g., go from $1^{st}$ courier to $2^{nd}$ courier to $3^{rd}$ courier to internet/catalog then back by $3^{rd}$ courier to $4^{th}$ courier to $5^{th}$ courier). A request may travel to the catalog by one path and content may be delivered back by a different path using a different courier.

By way of illustration, a wrangler named Tomas may go to town every day. His smart phone may carry information from which it can be determined that a trekker named John wants a certain electronic book to read (e.g., Turn Left At Machu Picchu). Tomas' smart phone may acquire the electronic book. Tomas may come in contact with Miguel and the electronic book may be copied to Miguel's smart phone. Miguel may then come in contact with Johann and the electronic book may be copied to Johann's tablet. Whoever of Tomas, Miguel, or Johann first comes in contact with John may deliver the electronic book to John. Tomas, Miguel, and Johann may or may not be aware that their device is being used to courier the electronic book. Tomas, Miguel or Johann may or may not be able to read the electronic book while it is being couriered. A later arriving courier may attempt to provide the electronic book to John but may determine that John already received the electronic book. The later arriving courier may then delete the electronic book, and, when the later arriving courier encounters another courier device may provide information to the other courier device that would also allow the other courier device to delete a copy of the electronic book intended for John.

While previous examples have described humans carrying devices (e.g., smart phones, tablets, laptops) around a landscape, apparatus 500 may, in different examples, be integrated into other apparatus. For example, the courier apparatus 500 may be integrated into a drone, a car, a train, a plane, or other apparatus that moves around a landscape.

Figure 6:
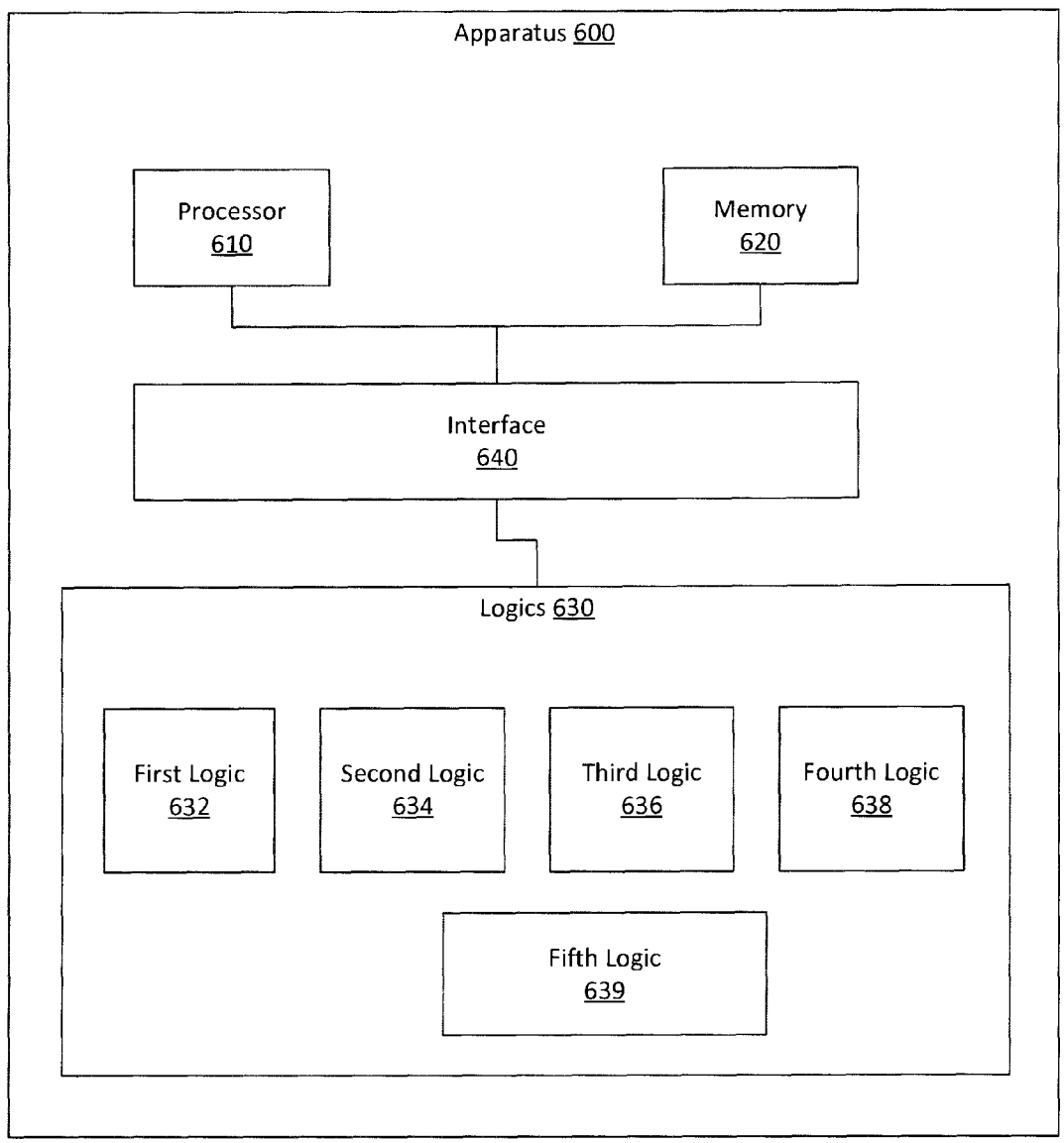
FIG. 6 illustrates an example apparatus for couriering content.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, different embodiments of apparatus 600 may include additional logics that perform additional functions.

Apparatus 600 also includes an additional fourth logic 638. Fourth logic 638 may provide a user interface for the courier apparatus 600. The user interface may display different information to facilitate using the courier network functionality provided by apparatus 600. For example, the user interface may display a strength of a signal strength between the courier apparatus 600 and the recipient apparatus or a reliability of a signal between the courier apparatus 500 and the recipient apparatus. Users may wish to visually inspect and then select content to be transferred using the courier apparatus 600. Therefore, the user apparatus may display a catalog of targeted electronic data available at the provider apparatus, a catalog of targeted electronic data available at another courier apparatus, or a catalog of targeted electronic data available at another recipient apparatus currently in range of the courier apparatus 600. To help decide whether to acquire a certain piece of content, the user interface may display a popularity measure for a piece of targeted electronic data.

A person who is carrying the courier apparatus 600 around may wish to know what they are carrying so that they may make decisions about keeping or deleting content or even decisions about which route to travel. Thus, the user interface may display a set of targeted electronic data requested by the recipient apparatus, a set of targeted electronic data requested by another recipient apparatus, or a set of targeted electronic data waiting to be delivered by the courier apparatus.

Users of a courier network may like to keep up on when data may be delivered. Thus, the user interface may display an expected time to deliver a piece of targeted electronic data. Users may also like to know which devices are participating in a courier network and therefore the user interface may display a current pairing between the courier apparatus 600 and the provider apparatus, a current pairing between the courier apparatus 600 and the recipient apparatus, or a potential pairing between the courier apparatus 600 and a potential recipient apparatus. A pairing may involve establishing a security relationship between devices (e.g., exchanging public keys), establishing an agency relationship where one device is authorized to act on behalf of the other device, or other relationships.

Apparatus 600 also includes an additional fifth logic 639. Fifth logic 639 may pair the recipient apparatus to the apparatus 600. Pairing the recipient apparatus to the apparatus 600 may allow the recipient to use the apparatus 600 as a courier. The pairing may be desired or necessary before sharing sensitive information like reputation data, account data, license data, or other information.

Figure 7:
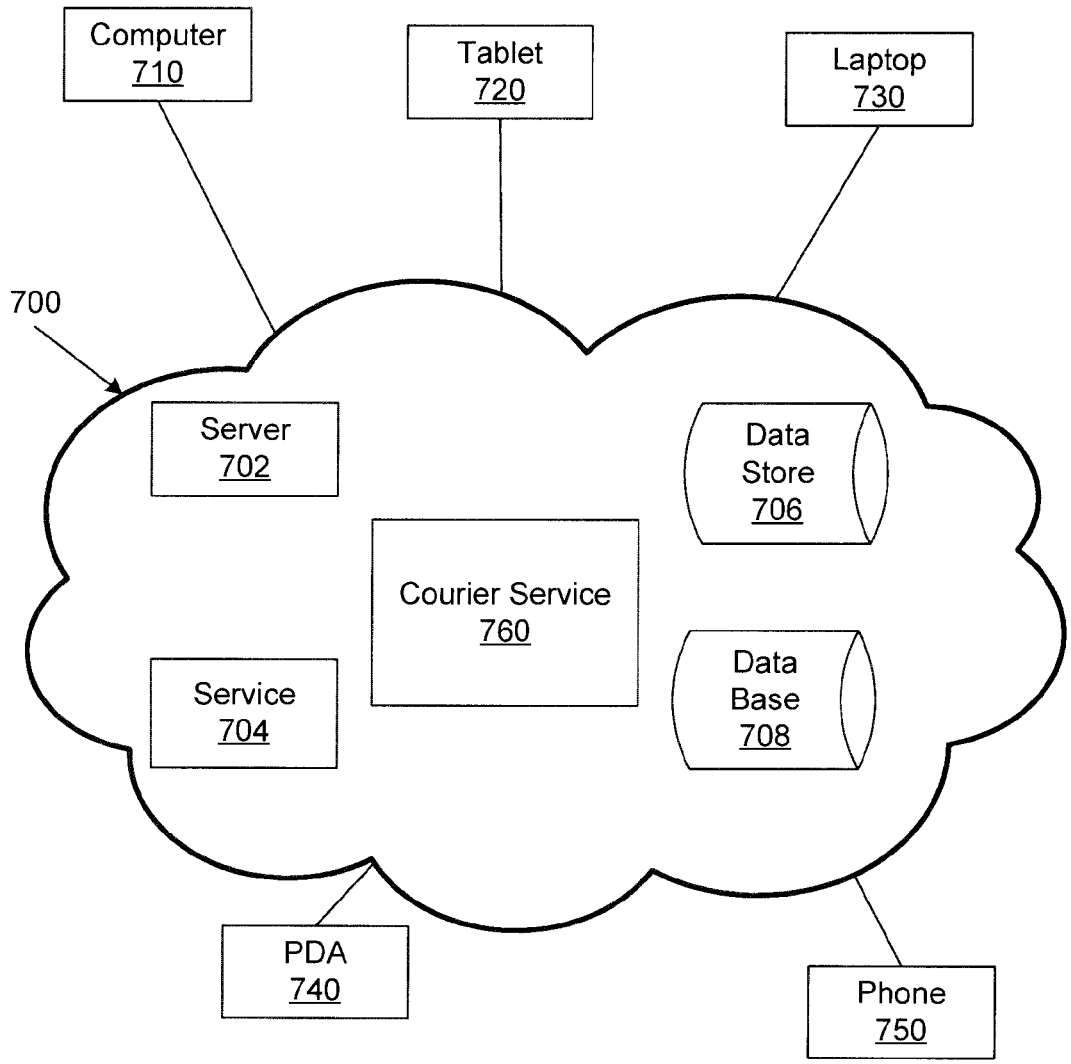
FIG. 7 illustrates an example cloud operating environment in which content may be couriered.

FIG. 7 illustrates an example cloud operating environment 700. A cloud operating environment 700 supports delivering computing, processing, storage, data management, applications, or other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example courier service 760 residing in the cloud. The courier service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the courier service 760. A courier device may have access to courier service 760 while a recipient device may not have direct access to the cloud 700 or courier service 760.

FIG. 7 illustrates various devices accessing the courier service 760 in the cloud. The devices include a computer 710, a tablet 720, a laptop computer 730, a personal digital assistant 740, and a mobile device (e.g., cellular phone, satellite phone, wearable computing device) 750. The courier service 760 may facilitate identifying curated electronic content to be provided to a courier device and identifying curated electronic content to be provided to a recipient device. The courier service 760 may support different distribution models including request/response models, push models, and pull models that act autonomously, organically, or under some service or device-based control.

It is possible that different users at different locations using different devices may access the courier service 760 through different networks or interfaces. In one example, the courier service 760 may be accessed by a mobile device 750. In another example, portions of courier service 760 may reside on a mobile device 750.

Figure 8:
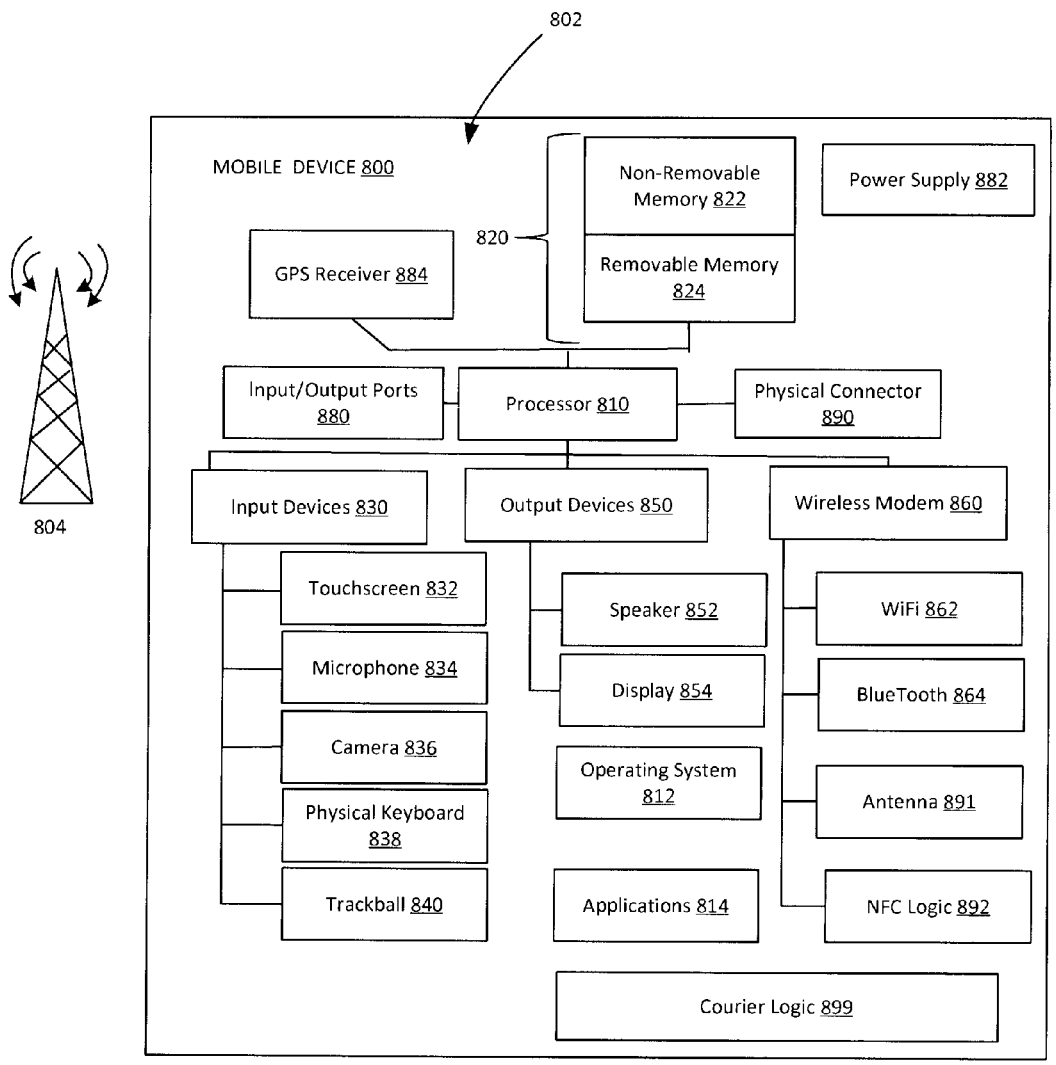
FIG. 8 is a system diagram depicting an exemplary mobile communication device that participates in couriering content.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite network.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include recommendation applications, user activity applications, recommendation applications, matrix factorization applications, mobile computing applications (e.g., email applications, calendars, contact managers, web browsers, messaging applications), video games, or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include requests for content, content, metadata about available content, or other data. The memory 820 can be used to store a subscriber identifier, such as an International Mobile Subscriber Identity (IMSI), and an equipment identifier, such as an International Mobile Equipment Identifier (IMEI). In one example, the identifiers may be transmitted to a network server to identify users or equipment.

The mobile device 800 can support one or more input devices 830 including but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). A NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting gestures to provide input to a recommendation application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC). Other short range communication protocols and device to device communications may be supported.

The mobile device 800 may include at least one input/output port 880, a power supply 882, a satellite navigation system receiver 884 such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a courier logic 899 that provides a functionality for the mobile device 800. For example, the courier logic 899 may provide a client for interacting with a service (e.g., service 760, FIG. 7). Portions of the example methods described herein may be performed by the courier logic 899. Similarly, the courier logic 899 may implement portions of apparatus described herein. In one embodiment, courier logic 899 may provide a content circuit that selects curated content to carry. The curated content is received from a first device and delivered to a second device after being transported from place to place in the mobile device 800. The content circuit selects the curated content based on a state of the first device and a state of the second device.

The courier logic 899 may also include a connection circuit that communicates the curated content between the first device and the second device using the mobile device 800 using a connectionless, device-to-device protocol. The connection circuit communicates the curated content between the first device and the mobile device 800 at a first time at a first physical location using a first protocol while the mobile device 800 is located at the first physical location.

The connection circuit communicates the curated content between the mobile device 800 and the second device at a second time at a second physical location using a second protocol while the mobile device 800 is located at the second physical location. The second protocol does not involve the Internet and is connectionless.

The state of the first device describes curated content that is currently stored on the first device. The state of the second device describes curated content that is to be stored on the first device. Thus, mobile device 800 may courier data in its memory by carrying the data from the first device at a first location to a second device at a second location.

Figure 9:
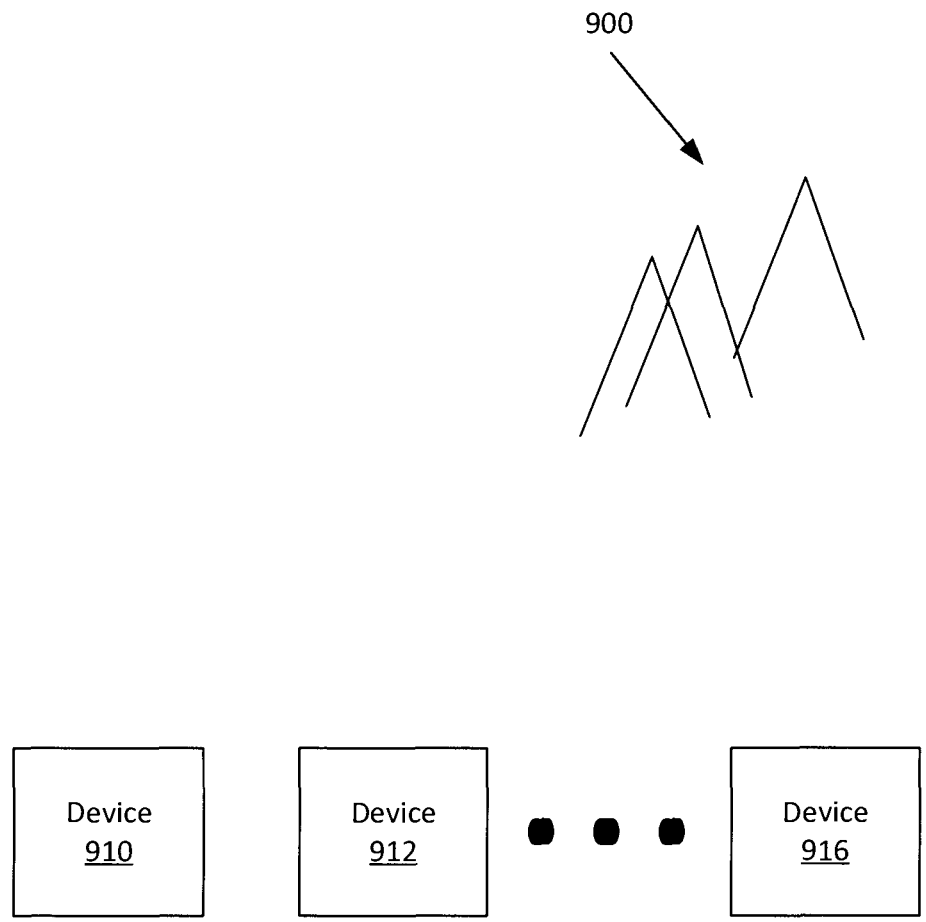
FIG. 9 illustrates a collection of example devices waiting for an example courier.

FIG. 9 illustrates a mountain range 900 and devices 910, and 912 through 916. The devices 912 through 916 may be able to communicate with each other but may not have any Internet connectivity.

Figure 10:
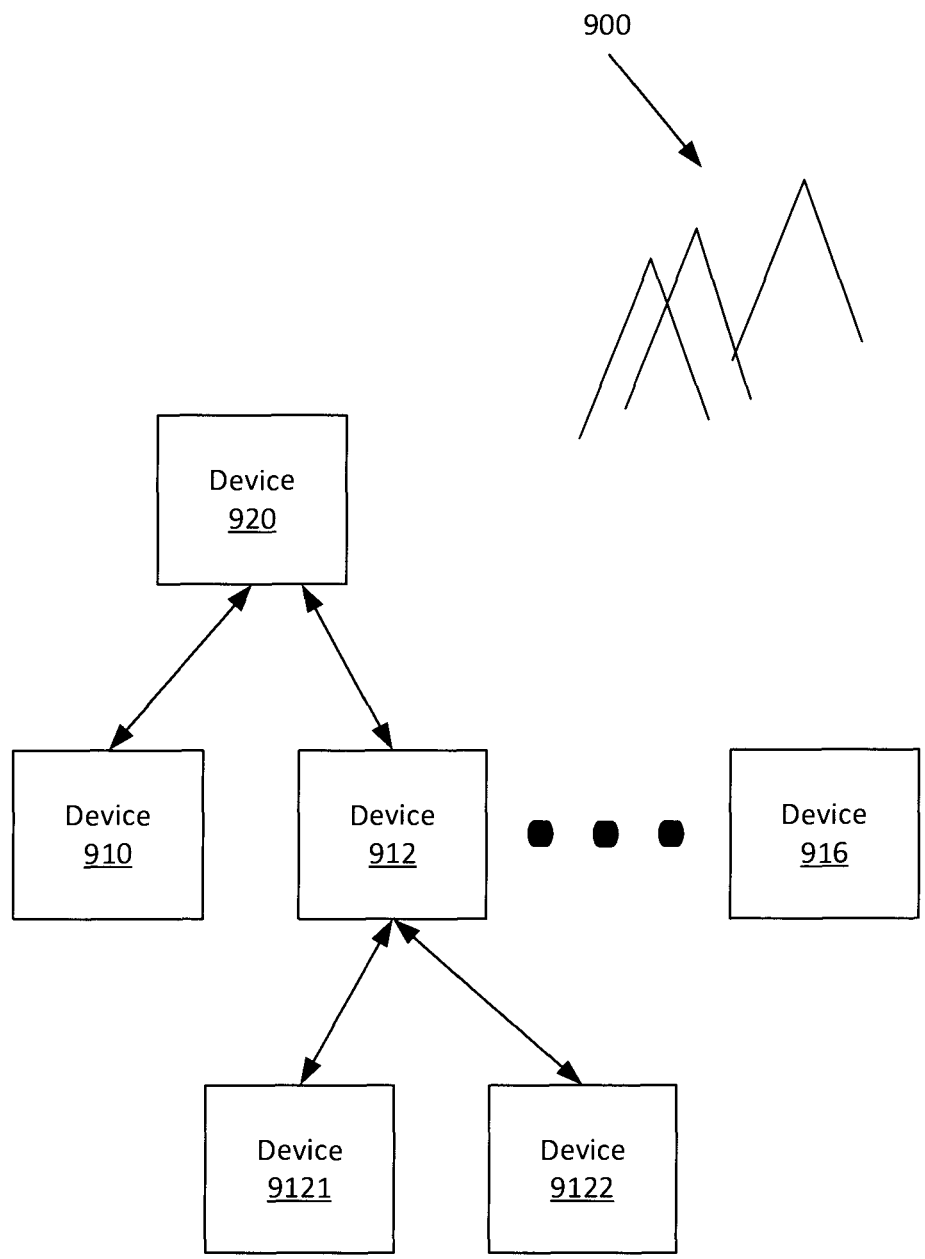
FIG. 10 illustrates a collection of example devices after an example courier has arrived.

FIG. 10 illustrates mountain range 900 and a different set of devices. In addition to devices 910 and 912 through 916, a device 920 is present as are devices 9121 and 9122. Device 920 may be acting as a courier device. Device 920 may have brought electronic content over the mountains 900. Device 920 may have specific electronic content that was previously requested by a device, or may have information about electronic content that is available on the other side of the mountains 900. Device 920 may provide content or metadata to device 910. Device 920 may also provide content or metadata to device 912. Device 912 may then in turn provide content or metadata to devices 9121 and 9122. While in range of the devices 910 through 916, device 920 may receive requests for content. The requests may come directly (e.g., from device 910) or may come indirectly (e.g., from device 9121 via device 912).

Figure 11:
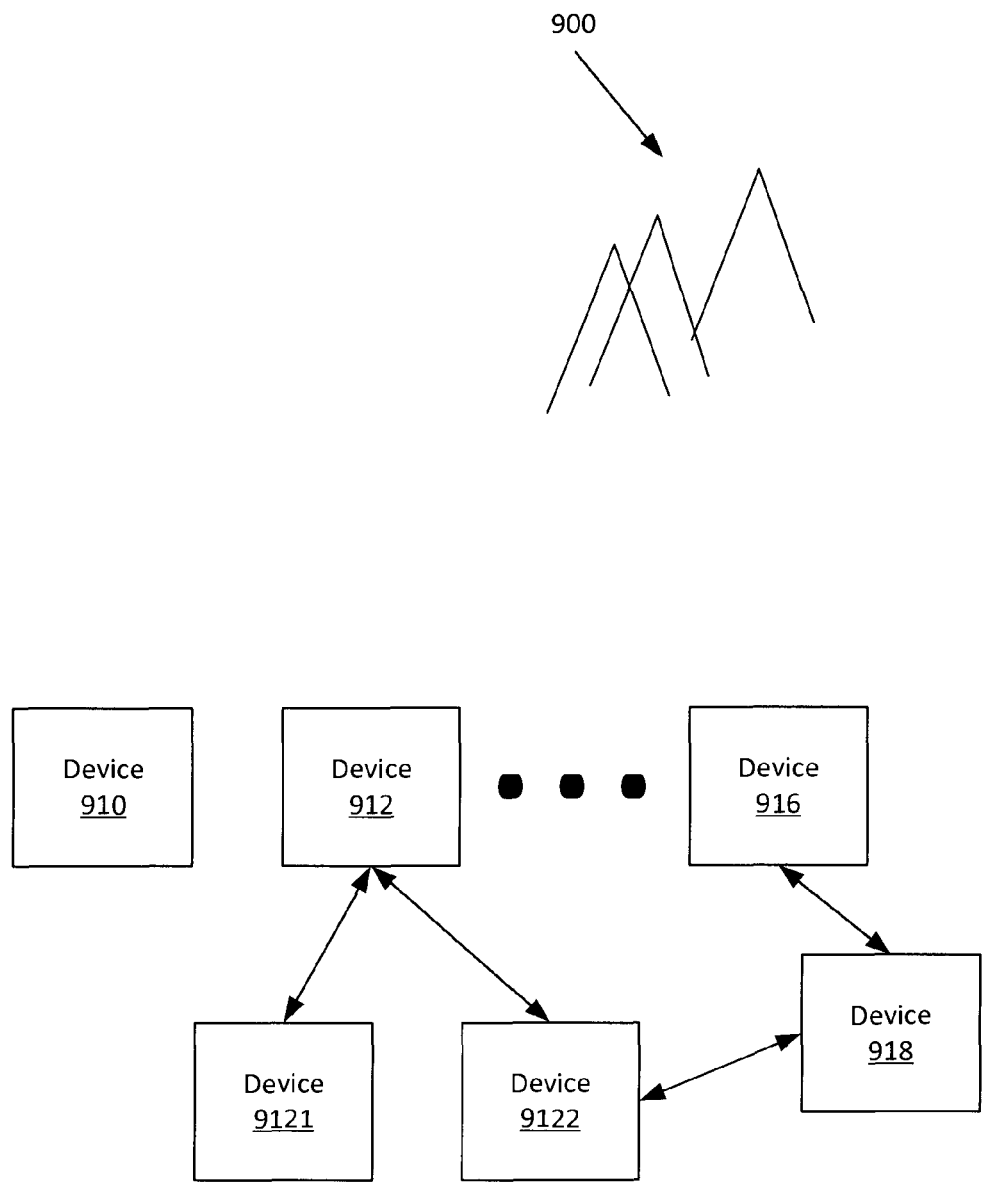
FIG. 11 illustrates a collection of example devices after an example courier has departed and another example device has arrived.

FIG. 11 illustrates the mountains 900 and a different set of devices. Courier device 920 may have left the area but another device 918 may have arrived. Device 918 may act as a courier or as a recipient. For example, if device 918 has data that one of the devices 910, 912 . . . 916, 9121, 9122 wants or needs, then device 918 may act as a courier and deliver the content. If one of the devices 910, 912 . . . 916, 9121, 9122 has information that device 918 wants or needs, then device 918 may act as a data recipient. If device 918 was carrying data that device 920 had already delivered, then device 918 may delete its copy of the data and may record the fact that the specific content had already been delivered.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 12:
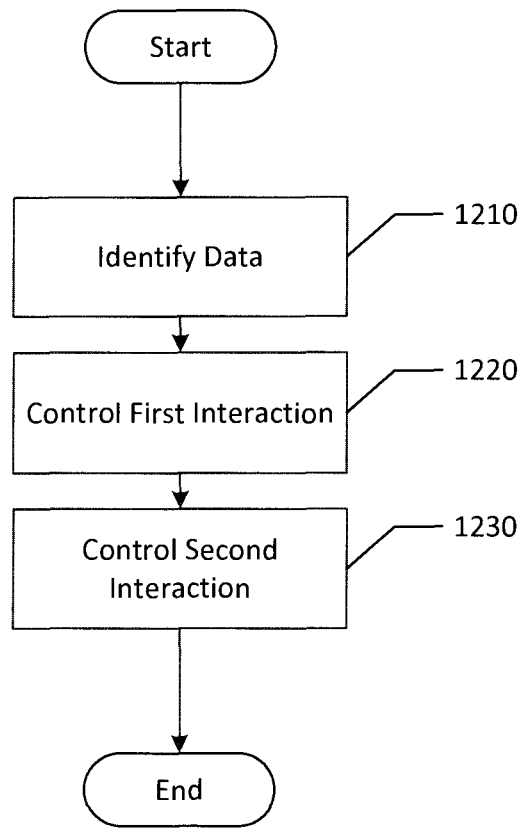
FIG. 12 illustrates a method associated with couriering content for a disconnected device.

FIG. 12 illustrates a method 1200. Method 1200 includes, at 1210, identifying curated electronic data to be couriered between a data provider and a data recipient by a courier device. Being "couriered" means that the curated electronic data is moved from one physical location to another physical location in the memory of the courier device. The courier device communicates with one physical device at one physical location and communicates with a different physical device at a second physical location.

The curated electronic data may be identified at 1210 based, at least in part, on state provided by the data recipient or state provided by the data provider. The state provided by the data recipient may identify an operating system on the data recipient, an application on the data recipient, or a piece of data (e.g., movie, book, document, database record) on the data recipient. The state provided by the data provider may identify an operating system on the data recipient, an application on the data recipient, or a piece of data on the data recipient.

Identifying the curated electronic data at 1210 may include identifying different things. For example, identifying the curated electronic data at 1210 may include identifying an update to the operating system located at the data recipient. The data recipient may or may not be aware that there is an update available. Thus, when presented with the opportunity to upgrade the operating system, the data recipient may accept the update or may refuse the update. Identifying the curated electronic data at 1210 may include identifying a replacement to the operating system. While an operating system has been described, the curated electronic data may concern applications, content (e.g., movies, books, documents), or other materials stored by the data recipient. Thus, identifying the curated electronic data at 1210 may include identifying an update to an application, identifying a replacement for an application, identifying an update to data, or identifying derivative data based on the piece of data. Derivative data may include, for example, a book sequel, a movie sequel, a patch to a scenario in a video game, or other data.

Method 1200 also includes, at 1220, controlling a first electronic interaction between the courier device and the data provider. The first electronic interaction occurs at a first time using a first communication path while the courier device is located in a first location. The first location may be a location where the courier device can connect to the data provider using the Internet or other connection. The first electronic interaction selectively transfers the curated electronic data from the data provider to the courier device.

Method 1200 also includes, at 1230, controlling a second electronic interaction between the courier device and the data recipient. The second electronic interaction occurs at a second time using a second communication path while the courier device is located in a second location. The second location may be a location where neither the courier device nor the data recipient can connect to the data provider or the Internet. The second electronic interaction selectively transfers the curated electronic data from the courier device to the data recipient.

In method 1200, the courier device will perform the first electronic interaction with the data provider at a first time in a first location using a first protocol (e.g., internet based). The courier device will then be relocated to within a threshold distance of the data recipient. For example, the courier device may be carried one hundred miles to a remote village. The courier device will then perform the second electronic interaction with the data recipient at a second time in the second location using a second protocol. Thus, the first electronic interaction and second electronic interaction are performed independently and may be performed with a significant gap (e.g., one hour, one day, one week) in time between the interactions. In one embodiment, the first location is at least one kilometer from the second location, the second time is at least one minute after the first time, and the second communication path does not include the Internet. The courier device may engage in a plurality of first interactions with a plurality of data providers at a plurality of first locations. The courier device may also engage in a plurality of second interactions with a plurality of data recipients at a plurality of second locations.

In one embodiment, the first electronic interaction includes the courier device providing a request to the data provider. The request may be for specific data sought by the data recipient or may be for data that is based on a prediction. The prediction may be made by the courier device or by an application, agent or service. In one embodiment, the courier device may not provide a request but may provide metadata about the data recipient. The metadata may provide information upon which a decision concerning what data to provide is made.

Since the courier device may provide information to the data provider, the courier device may also receive data back from the data provider. The first electronic interaction may include the courier device receiving data requested by the data recipient. The first electronic interaction may also include the courier device receiving data selected by the data provider. Additionally or alternatively, the first electronic interaction may include the courier device receiving metadata describing data that is available at the data provider. The metadata may then be available for inspection by a data recipient.

While FIG. 12 illustrates various actions occurring in serial, it is to be appreciated that various actions illustrated in FIG. 12 could occur substantially in parallel. By way of illustration, a first process could identify data, a second process could control a first interaction, and a third process could control a second interaction. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 1200. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, read only memory (ROM), and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, a compact disk (CD), a random access memory (RAM), a read only memory (ROM), a memory chip or card, a memory stick, and other media from which a computer, a processor or other electronic device can read.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store electronic data. A data store may be, for example, a database, a table, a file, a list, a queue, a heap, a memory, a register, and other physical repository. In different examples, a data store may reside in one logical or physical entity or may be distributed between two or more logical or physical entities. Storing electronic data in a data store causes a physical transformation of the data store.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A courier apparatus, comprising:
   a processor;
   a set of logics that control the courier apparatus to courier targeted electronic data between a provider apparatus in a first physical location and a recipient apparatus in a second physical location, where the first physical location and the second physical location are separated by a threshold distance;
   a memory that stores the targeted electronic data or metadata concerning the targeted electronic data; and
   an interface to connect the processor, the memory, and the set of logics;
   the set of logics comprising:
      a first logic that identifies the targeted electronic data based on information about the recipient apparatus;
      a second logic that acquires the targeted electronic data from the provider apparatus at a first time using a first communication approach while the apparatus is located at the first physical location, and
      a third logic that provides the targeted electronic data to the recipient apparatus at a second time using a second communication approach while the apparatus is located at the second physical location,
      where the second communication approach does not use the Internet, and
      where the first time and the second time are separated by at least a threshold amount of time.

2. The courier apparatus of claim 1, where the first logic identifies the targeted electronic data based on information about the recipient apparatus that is provided by the recipient apparatus.

3. The courier apparatus of claim 2, where the information about the recipient apparatus describes a state of the recipient apparatus.

4. The courier apparatus of claim 2, where the information about the recipient apparatus is a request for specific electronic data.

5. The courier apparatus of claim 1, where the first logic identifies the targeted electronic data based on information about the recipient apparatus that is provided by the provider apparatus.

6. The courier apparatus of claim 5, where the information about the recipient apparatus describes a state of the recipient apparatus.

7. The courier apparatus of claim 5, where the information about the recipient apparatus is a request for specific electronic data, a response to a request for specific electronic data, or a catalog of curated electronic data that is available at the provider apparatus for couriering to the recipient apparatus.

8. The courier apparatus of claim 1, where the threshold distance is at least one mile.

9. The courier apparatus of claim 1, where the threshold amount of time is at least one hour.

10. The courier apparatus of claim 1, where the targeted electronic data is an operating system, an operating system update, an application, an application update, a piece of content, an update to a piece of content, or an encryption key.

11. The courier apparatus of claim 1, where the targeted electronic data has an expiration time, and where the third logic will not provide the targeted electronic data after the expiration time.

12. The courier apparatus of claim 1, where the first logic identifies the targeted electronic data based on information transferred in two or more request/response iterations between the recipient apparatus and the provider apparatus, where a request/response iteration involves couriering a request from the recipient apparatus to the provider apparatus and couriering a response from the provider apparatus to the recipient apparatus.

13. The courier apparatus of claim 12, where members of the two or more request/response iterations are separated by more than an hour.

14. The courier apparatus of claim 12, where the memory stores a set of requests from the recipient apparatus or a set of responses from the provider apparatus, and where the first logic identifies the targeted electronic data by replaying members of the set of requests or members of the set of responses.

15. The courier apparatus of claim 1, where identifying, acquiring, and providing the targeted electronic data involves two or more iterations of interactions between the recipient apparatus and the provider apparatus via the courier apparatus.

16. The courier apparatus of claim 1, where the courier apparatus is integrated into a drone.

17. The courier apparatus of claim 1, where the first logic provides an estimated fulfillment time for the targeted electronic data or an estimated fulfillment cost for the targeted electronic data.

18. The courier apparatus of claim 1, where the first logic identifies the targeted electronic data based on a predictive heuristic, where the predictive heuristic compares a current state of the recipient apparatus to an output from a recommendation system.

19. The courier apparatus of claim 1, where the second logic selectively does not acquire the targeted electronic data upon detecting a request cancellation from the recipient apparatus, upon receiving a denial of the request from the provider apparatus, upon receiving a denial of the request from a service, upon evaluating a reputation status associated with the recipient apparatus, or upon evaluating an account status associated with the recipient apparatus.

20. The courier apparatus of claim 1, where the second logic acquires the targeted electronic data using a request/response model, where a request moves from the recipient apparatus to the provider apparatus via the courier apparatus and where a response moves from the provider apparatus to the recipient apparatus via the courier apparatus.

21. The courier apparatus of claim 1, where the second logic acquires the targeted electronic data using a push model, where the targeted electronic data is pushed to the courier apparatus from a content provider, from a service, from a courier device, or from a recipient apparatus.

22. The courier apparatus of claim 1, where the second logic acquires the targeted electronic data using a pull model, where the second logic pulls the targeted electronic data from a content provider, from a service, from a courier device, or from a recipient apparatus.

23. The courier apparatus of claim 1, where the second logic selects a communication channel for receiving the targeted electronic data from the provider apparatus based on cost, security, bandwidth, or speed.

24. The courier apparatus of claim 1, where the second logic acquires the targeted electronic content using a first secure communication and where the third logic provides the targeted electronic content using a second secure communication.

25. The courier apparatus of claim 1, where the second logic provides an indication to a user of the courier apparatus describing a period of time to remain in place to facilitate completing a transfer of targeted electronic content to the courier apparatus or to facilitate completing a transfer of a request from the courier apparatus.

26. The courier apparatus of claim 1, where the third logic provides the targeted electronic data using a push model, where the push model pushes the targeted electronic data directly to the recipient apparatus or indirectly to another apparatus that is likely to encounter the recipient apparatus.

27. The courier apparatus of claim 1, where the third logic provides the targeted electronic data using a request/response model, where the request is carried from the recipient apparatus to the courier apparatus and from the courier apparatus to the provider apparatus, and where the response is carried from the provider apparatus to the courier apparatus and from the courier apparatus to the recipient apparatus.

28. The courier apparatus of claim 1, where the third logic selects a communication channel for providing the targeted electronic data to the recipient apparatus based on cost, security, bandwidth, or speed.

29. The courier apparatus of claim 1, comprising a fourth logic that provides a user interface for the courier apparatus, where the user interface displays a strength of a signal between the courier apparatus and the recipient apparatus, a reliability of a signal between the courier apparatus and the recipient apparatus, a catalog of targeted electronic data available at the provider apparatus, a catalog of targeted electronic data available at another courier apparatus, a catalog of targeted electronic data available at another recipient apparatus currently in range of the courier apparatus, a set of targeted electronic data requested by the recipient apparatus, a set of targeted electronic data requested by another recipient apparatus, a set of targeted electronic data waiting to be delivered by the courier apparatus, an expected time to deliver a piece of targeted electronic data, a popularity measure for a piece of targeted electronic data, a current pairing between the courier apparatus and the provider apparatus, a current pairing between the courier apparatus and the recipient apparatus, or a potential pairing between the courier apparatus and a potential recipient apparatus.

30. The courier apparatus of claim 1, comprising a fifth logic that pairs the recipient apparatus to the apparatus acting as a courier.

31. The courier apparatus of claim 1, where the second logic selectively deletes the targeted electronic data from the memory upon determining that the targeted electronic data has already been received by an intended recipient apparatus or upon determining that the targeted electronic data has expired.

32. A method, comprising:
  identifying curated electronic data to be couriered between a data provider and a data recipient by a courier device, where the curated electronic data is identified based, at least in part, on state provided by the data recipient or state provided by the data provider,
  controlling a first electronic interaction between the courier device and the data provider, where the first electronic interaction occurs at a first time using a first communication path while the courier device is located in a first location; and
  controlling a second electronic interaction between the courier device and the data recipient, where the second electronic interaction occurs at a second time using a second communication path while the courier device is located in a second location,
  where the first electronic interaction selectively transfers the curated electronic data from the data provider to the courier device,
  where the second electronic interaction selectively transfers the curated electronic data from the courier device to the data recipient, and
  where the first electronic interaction and second electronic interaction are performed independently.

33. The method of claim 32, where the first location is at least one kilometer from the second location, where the second time is at least one minute after the first time, and where the second communication path does not include the Internet.

34. The method of claim 33, where the state provided by the data recipient identifies an operating system on the data recipient, an application on the data recipient, or a piece of data on the data recipient.

35. The method of claim 34, where the state provided by the data provider identifies an operating system on the data recipient, an application on the data recipient, or a piece of data on the data recipient.

36. The method of claim 35, where identifying the curated electronic data includes identifying an update to the operating system, identifying a replacement to the operating system, identifying an update to the application, identifying a replacement for the application, identifying an update to the piece of data, or identifying derivative data based on the piece of data.

37. The method of claim 32, where the first electronic interaction includes the courier device providing a request for specific data from the data recipient, the courier device providing a request for specific data based on a prediction, or the courier device providing metadata about the data recipient.

38. The method of claim 37, where the first electronic interaction includes the courier device receiving data requested by the data recipient, the courier device receiving data selected by the data provider, or the courier device receiving metadata describing data that is available at the data provider.

\* \* \* \* \*